United States Patent [19]

Yamada et al.

[11] 4,060,813

[45] Nov. 29, 1977

[54] INK DROP WRITING APPARATUS

[75] Inventors: Takahiro Yamada; Tetsuo Doi, both of Hitachi, Japan

[73] Assignee: Hitachi, Ltd., Japan

[21] Appl. No.: 667,588

[22] Filed: Mar. 17, 1976

[30] Foreign Application Priority Data

| | | |
|---|---|---|
| Mar. 17, 1975 | Japan | 50-31212 |
| Mar. 19, 1975 | Japan | 50-32355 |

[51] Int. Cl.$^2$ .......... G01D 18/00

[52] U.S. Cl. .......... 346/75

[58] Field of Search .......... 346/75

[56] References Cited

U.S. PATENT DOCUMENTS

| | | | |
|---|---|---|---|
| 3,596,276 | 7/1971 | Lovelady | 346/75 X |
| 3,886,564 | 5/1975 | Naylor | 346/75 |
| 3,971,039 | 7/1976 | Takano | 346/75 |

OTHER PUBLICATIONS

Ruddy, G. A., Position & Synchronization Sensor for an Ink Jet Printer; IBM Tech. Disc. Bulletin, vol. 15, No. 9, Feb. 1973, pp. 2785–2786.

Fillmore et al., Deflection Servo Initializaton; IBM Tech. Disc. Bulletin, vol. 16, No. 3, Aug. 1973, pp. 1031–1033.

Boehner et al.; Two-Level Ink Jet Deflection Control System, IBM Tech. Disc. Bulletin, vol. 16, No. 10, Mar. 1974, 3308–3311.

Chen et al.; Feedback for Synchronized Pressure Jet Using Optical Sensor, IBM Bulletin, vol. 16, No. 12, May 1974, pp. 3877–3878.

*Primary Examiner*—Joseph W. Hartary

*Attorney, Agent, or Firm*—Craig & Antonelli

[57] ABSTRACT

In an apparatus of the type wherein ink under pressure is applied to a nozzle which is vibrated so that the ink emitted from the nozzle thereafter breaks up into ink drops which are charged in a charging tunnel in response to a video signal, means are provided, in accordance with this invention, for compensating the amount of charge on each ink drop or the strength of the deflecting field action on the ink drop, on the basis of information from a detecting means which detects the amount of deflection of one or more calibrating drops periodically so that the amount of deflection of the drop of writing fluid for a given charge may be held to a predetermined value.

13 Claims, 11 Drawing Figures

INK DROP WRITING APPARATUS

BACKGROUND OF THE INVENTION

This invention relates to writing apparatus, and more particularly to an improved ink drop writing apparatus which controls a writing fluid in response to an input signal so as to directly record certain input information on a writing medium.

FIG. 1 is a schematic drawing of a presently known arrangement which will be described to provide an understanding of the type of device to which this invention is directed. A nozzle 1 is vibrated by an electromechanical transducer 3, which is connected to a high frequency power source 2. The transducer 3 is usually placed adjacent to or around the nozzle 1. Ink 4 is fed to the nozzle 1 under pressure in the direction of an arrow A causing an ink stream 5 to be emitted from the nozzle with a predetermined velocity. The ink stream 5, which is produced by the nozzle 1, is subjected to periodic constrictions as a result of the vibration of the nozzle. The constrictions grow as the ink stream travels so that ink drops 6 are regularly generated from the stream in synchronism with the high frequency vibration.

At this time, a signal voltage from a recording pattern signal-generator source 8, which is synchronized in frequency with the excitation of the electromechanical transducer 3 and whose amplitude corresponds to a recording information input B, is applied to a charging electrode 7, for charging the ink drop, with a predetermined phase corresponding to the drop generating phase. The ink drop 6 is thereby charged in response to the applied signal voltage. Thereafter, the ink drop is deflected according to the charge thereon corresponding to the recording pattern signal voltage by an electrostatic field which is established by deflecting electrodes 9, across which a d.c. high voltage source 10 is connected.

The ink drops unnecessary for forming a recording pattern receive no charge and are not deflected by the deflecting electrodes 9. Thus, these ink drops proceed along a linear path and are intercepted by a waste catcher 11, and only the necessary drops which have a charge thereon are deflected to pass above the waste catcher and form recording dots on a writing medium or paper 12. While the ink drops are being deflected and scanned in a Y-direction on the basis of the above principle for deflecting the ink drops, the nozzle 1 and the paper 12 are relatively moved in an X-direction. As a result, a stripe-like recording pattern 13 can be obtained.

In such an ink drop writing apparatus, the distance or amount of deflection D of the ink drop in the Y-direction can be expressed by the following well known relationship (refer to FIG. 2);

$$D = \frac{1}{2} \; \frac{E \cdot Q}{M} \left(\frac{b}{V_d}\right)^2 \cdot \left(1 + \frac{2L}{b}\right) \qquad (1)$$

where

M : mass of the ink drop,

Q : amount of charge on the ink drop, $V_d$ : flying velocity of the ink drop,

E : strength of the deflecting electrostatic field, b : extent of the deflecting electrostatic field in the flying direction of the drop, L : distance between the end of the deflecting electrostatic field and the paper. As apparent from the principle of the writing operation, the amount of deflection D of the ink drop is directly related to the width of the pattern to be recorded on the paper and the recording position. In FIG. 2, numeral 14 designates the deflecting electrostatic field. Unless the amount of deflection of the ink drop for a given charge in the drop is held constant, the width and the position of the pattern will change, and a proper recording pattern 13A, as indicated in FIG. 3, will become distorted, as shown at 13B or 13C. Accordingly, where the recording pattern 13 is composed of characters, the magnitude and the line space of the characters change.

Where the recording is reproduced by successively arraying stripe-like recording patterns, as described, a proper arrayal, as shown at (1) in FIG. 4, becomes a distorted pattern as shown at (2) in which an interstice appears and the patterns are doubled. Where the stripe-like recording patterns are recorded in superposition, for example where recording dots by ink drops of different colors are formed for color indication, undesirable misregistration of the patterns and color shading take place.

Among the variables in the equation (1), *E, b* and *L* can be set at relatively precise predetermined values comparatively easily. These can be kept substantially constant without any problem in practical use as against changes in the surroundings of the writing apparatus even in the case of operation of the apparatus over a long period of time. In contrast, the values of M, Q and $V_d$ are difficult to set at precise predetermined values and to be held constant at these values against the changes in the surroundings and in case of the operation of the apparatus over a long period of time. Thus, when efforts are made to hold these variables at the required predetermined values in order to avoid the inconveniences stated previously, the ink drop writing apparatus is prone to become very complicated.

For example, the temperature of the ink is liable to rise due to a change in the ambient temperature of the ink drop writing apparatus or because of the running of the apparatus for a long period of time. For this reason, the properties (such as surface tension and viscosity) of the ink will change, or the pressure for supplying the ink to the nozzle will change. In consequence, the flying velocity $V_d$ of the ink drop or the mass M thereof changes, so that the amount of deflection D of a drop of given charge in a predetermined electrostatic field changes. Further, since the length of the ink stream changes with a rise in the temperature of the ink, the degree of coupling between the ink stream and the charging electrode changes. Therefore, the amount of charge Q changes, and the deflection distance D changes in turn. In order to avoid the changes in the amount of deflection D, complicated means are required for keeping the temperature and properties of the ink constant as well as means for supplying the ink under constant pressure to the nozzle.

OBJECTS AND SUMMARY OF THE INVENTION

Figure 1:
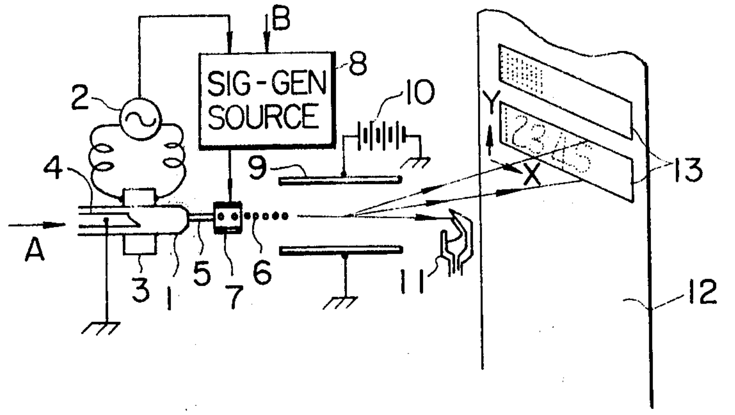
FIG. 1 is a schematic drawing of a prior-art arrangement of an ink drop writing apparatus.
Figure 2:
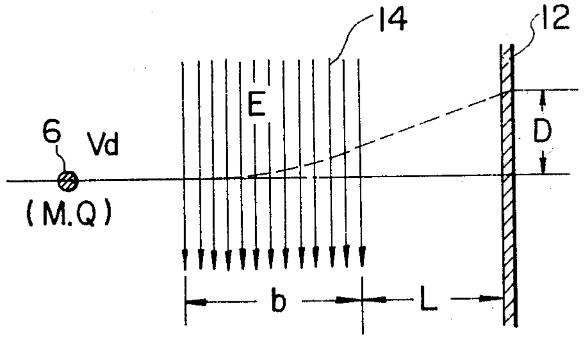
FIG. 2 is a schematic diagram illustrating an operating principle for evaluating the extent of deflection of an ink drop travelling through an electrostatic field.
Figure 3:
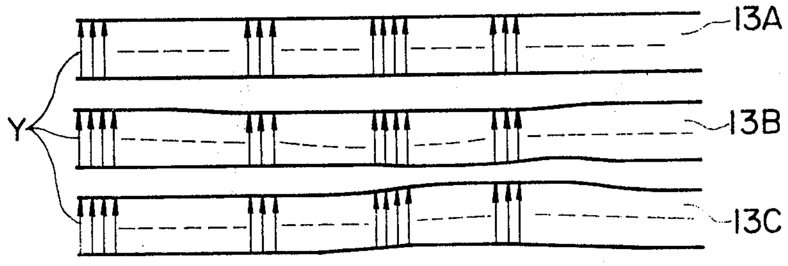
FIG. 3 is a diagram illustrating recording patterns.
Figure 4:
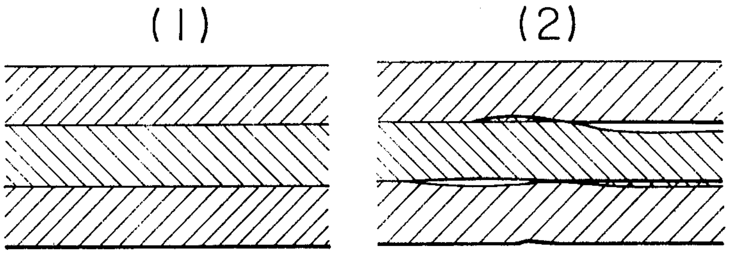
FIG. 4 is a diagram illustrating problems in the reproduction of recording patterns.

An object of this invention is to provide an improved ink drop writing apparatus in which the amount of deflection of an ink drop is precisely determined in response to a recording signal.

Another object of this invention is to provide an improved ink drop writing apparatus which can form a recording pattern of predetermined width at a predetermined position on the writing paper.

In one aspect of the performance of this invention, there is provided an ink drop writing apparatus wherein a writing fluid is supplied to a nozzle, the writing fluid is formed into drops which fly towards a writing medium, the drops are deflected in response to recording signals, and the drops adhere to the writing medium, comprising means to detect the extent of deflection of the drop of writing fluid and means to control the amount of charge on the drop on the basis of information received from the detecting means so that the amount of deflection of the drop of writing fluid may be maintained at a predetermined value.

In another aspect of performance of this invention, the afore cited means to control the amount of charge on the drop is replaced by means to control the strength of the deflecting field which acts on the drop so that the amount of deflection of the drop of writing fluid may be maintained at a predetermined value.

DESCRIPTION OF THE PREFERRED EMBODIMENTS

An embodiment of the ink drop writing apparatus of this invention will be described with reference to FIG. 5. A nozzle 51 is vibrated by an electromechanical transducer 54 which is connected through an amplifier circuit 53 to a high-frequency power source 52. The transducer 54 is usually placed adjacent to or around the nozzle 51. When ink pressure is supplied to the nozzle 51 in the direction of an arrow C, an ink stream is produced, and periodic constrictions are produced therein as a result of the vibrations of the nozzle. The constrictions of the ink stream grow, to regularly generate ink drops 55 in synchronism with the high-frequency vibrations. At this time, a signal voltage from a recording pattern signal-generating source system, which is synchronous with the excitation of the transducer 54 and is responsive to a recording information input, is applied to a charging electrode 56, for charging the ink drop with a predetermined phase corresponding to the drop generating phase. The ink drop 55, which is charged in response to this voltage, if deflected according to the charge thereof corresponding to the recording pattern signal voltage by an electrostatic field which is established between deflecting electrodes 57, which are connected to a d.c. high voltage source 58. The ink drops 55 unnecessary for forming a recording pattern receive no charge, are not deflected, and therefore are intercepted by a waste catcher 59, and only the necessary drops 55 are deflected so as to pass above the waste catcher and form recording dots on paper 60.

The drop charging signal is obtained in such a way that a drop deflection calibrating signal from a deflection calibrating signal-generator circuit 61, which is synchronized with the generation of the drop, and a recording signal from a recording signal-generator circuit 62, which is also synchronized with the generation of the drop, are combined by a composing circuit 63. The composite signal at the output of composing circuit 63 is regulated by a drop charging signal voltage-adjusting circuit 64.

The ink drop 55 generated from the nozzle 51 is charged and deflected due to that part of the drop charging signal formed by the drop deflection calibrating signal applied to the charging electrode, said drop charging signal being obtained by amplifying the adjusted voltage output of circuit 64 by means of an amplifier 65 having a fixed gain. Whether or not the amount of deflection of the drop is a predetermined amount is monitored by a drop deflection detecting circuit 66 and a deflection judging circuit 67. When the amount of deflection deviates from the predetermined required deflection, an electric signal corresponding to the deviation is issued from a deflection correcting signal-generating circuit 68. The electric signal is applied to a voltage control input of the charging signal voltage-adjusting circuit 64, to adjust the voltage of the drop charging signal so that the amount of deflection of the drop is maintained at the predetermined value.

A waveform shaping circuit 69 is connected in series with the high-frequency power source 52. A terminal of the waveform shaping circuit 69 remotes from the power source 52 is connected to both the calibrating signal generator circuit 61 and the recording signal generator circuit 62. Consequently, the deflection sensitivity of the drop is regulated to the required predetermined value at all times. The ink drop 55 is deflected at all times by a predetermined amount which corresponds to the magnitude of the recording signal. Thus, the recording of a predetermined width can be executed at predetermined positions on the writing paper 60.

This embodiment of the present invention is directed to an ink drop writing apparatus in which the amount of charge applied to the drop is regulated by regulating the magnitude of the signal voltage to be applied to the charging electrode 56. Here, detailed circuits of the various blocks shown in FIG. 5 will be explained with reference to FIGS. 6 through 9.

Figure 8:
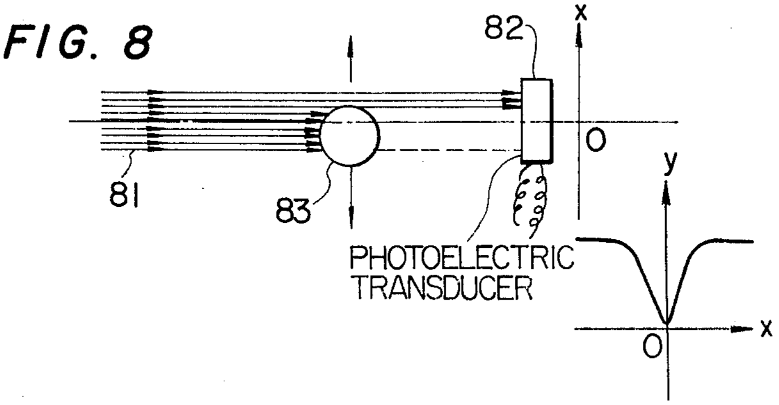
FIGS. 8 and 9 are schematic diagrams which facilitate the explanation of a deflection detector.
Figure 9:
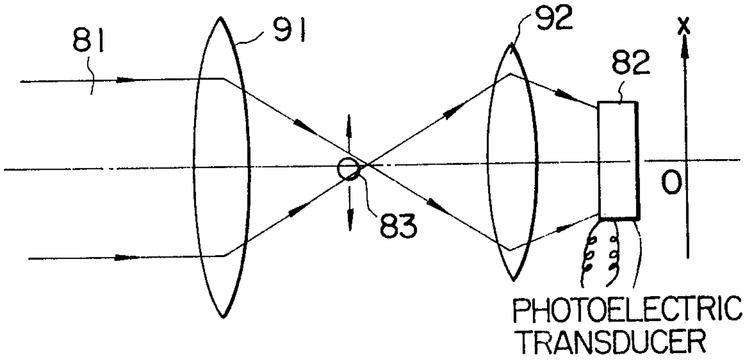

Examples of the structure of the drop deflection detector 66 for detecting the amount of deflection of the ink drop 55 charged by the deflection calibrating signal are illustrated in FIGS. 8 and 9. In the example of FIG. 8, a deflection calibrating ink drop beam 83 is generated by the apparatus, which calibrating beam consists of a series of drops for calibrating the amounts of deflection of an ink drop beam by detecting to what extent the beam intercepts a light beam 81 which is fixed at a predetermined position. An $x$-axial movement of the drop beam 83 as produced by a change in the drop deflecting efficiency for a drop which is to have a given charge is detected in the form of a change in the quantity of light incident on a photoelectric transducer 82 (for example, the phototransistor 661 in FIG. 6, to be described hereinafter.) An electric output $y$ responsive to a drop beam position $x$ is generated in this way. When the deflection calibrating drop beam 83 passes through the center of the light beam 81 ($x = 0$), the electric output becomes a minimum, and when it deviates from the central position, the output increases. The control over the amount of charge applied to the drop, as explained in connection with FIG. 5, is provided by the output of the detector. The deflection calibrating drop beam 83 is controlled at all times in a direction traversing the center of the light beam 81.

The deflection detector in FIG. 9 is based on the same principle of operation as the detector of FIG. 8, but this detector is of the type in which a thick light beam 81 is formed by lenses 91 and 92.

Figure 6:
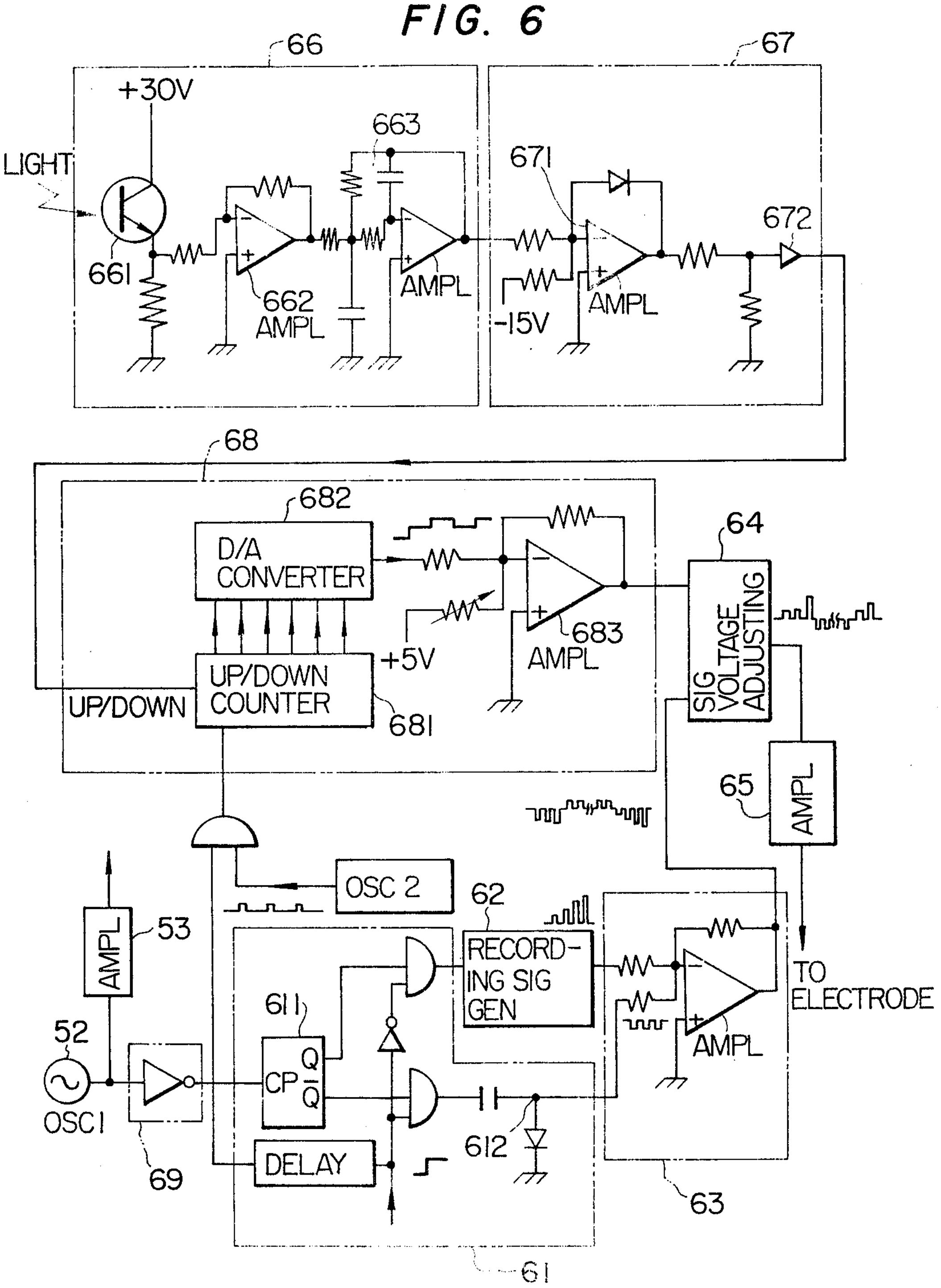
FIG. 6 is a schematic block diagram illustrating in more detail various circuits shown in FIG. 5.

In FIG. 6, the drop deflection detector circuit 66 is mainly composed of a phototransistor 661 which receives light from a light source (not shown), an amplifier 662 connected to the emitter of phototransistor 661, and a low pass filter circuit 663 which includes a diode, resistors, capacitors and an amplifier. A signal from the phototransistor 661, which reflects a change in the quantity of light detected thereby, is amplified by the amplifier 662 and is thereafter introduced to the low pass filter 663, from which an output is derived. The detection output varies in accordance with the characteristic illustrated in FIG. 7 in relation to the amount of deflection of the ink drop beam charged by the deflection calibrating signal.

As seen in FIG. 6, a deflection judging circuit 67 is composed of a comparator amplifier 671 and an interface amplifier 672. In this case, the circuit 67 judges whether or not the detection output lies at the lowest level, as illustrated in FIG. 8. It controls the connecting signal generating circuit 68 which regulates the drop charging signal-adjusting circuit 64.

Figure 7:
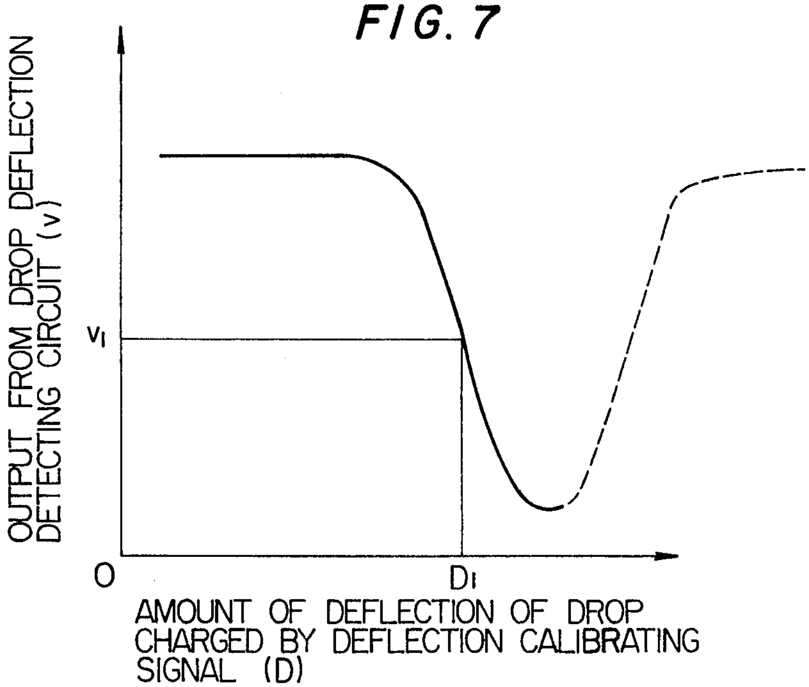
FIG. 7 is a graph of the relationship between the output of a deflection detecting circuit and the amount of deflection of an ink drop.

On the other hand, a method is also considered wherein the amount of deflection of the drop is controlled to $D_1$ indicated in FIG. 7 at which the detection output is $V_1$ in an intermediate state in the course of decrease.

In the present embodiment, this method will be explained below. The deflection judging circuit 67 is constructed of the comparator 671 for judging whether the detection output is larger or smaller than the value $V_1$ and the interface amplifier 672 applies the output thereof to the deflection correcting signal-generating circuit 68. When the amount of deflection D of the calibrating drop is $D < D_1$, the detection output $\nu$ is $\nu > \nu_1$, and hence, an output of a low level (for example, level "0") is transmitted to the deflection correcting signal-generator circuit 68. When $D > D_1$, $v < v_1$, and hence, an output of a high level (for example, level "1") is transmitted to circuit 68. In order to enhance the stability of the judging operation of the circuit 67, the comparator 671 may be provided with some hysteresis characteristic.

As apparent from FIG. 6, the deflection correcting signal-generator circuit 68 is composed mainly of an UP/DOWN counter 681, a D/A converter 682 and an amplifier 683. It operates in response to the signal "1" or "0" from the deflection judging circuit 67. Where the signal of the level "0" is received ($D < D_1$), the UP/DOWN counter 681 counts up each time a pulse from an oscillator OSC2 arrives. Then, an output voltage from the D/A converter 682 connected to the counter 681 increases. On the other hand, where a signal of level "1" is received ($D < D_1$), the UP/DOWN counter 681 counts down, and the output voltage from the D/A converter 682 decreases. The output voltage from the D/A converter as thus controlled is added to a d.c. bias voltage of a predetermined value by an adder circuit connected to the input of amplifier 683. The sum becomes a control input to the drop charging signal voltage-adjusting circuit 64.

Here, the oscillator OSC2 generates at a predetermined frequency pulses having a period longer than the time interval between the charging of the ink drop by the charging electrode 56 and the arrival thereof at the detector. The D/A converter 682 generates a voltage at the central position of voltage levels which it can change, and controls the drop charging signal voltage-adjusting circuit 64. At this time, the d.c. bias voltage for the adder is set so that the amount of deflection of the ink drop may become close to the value $D_1$ in FIG. 7.

As seen from FIG. 6, the drop deflection calibrating signal-generator circuit 61 is composed mainly of a flip-flop circuit 611 and a clamp circuit 612. The generator circuit 61, the recording signal generator circuit 62 and the composer circuit 63 constitute the drop charging signal-preparing system.

Figure 10:
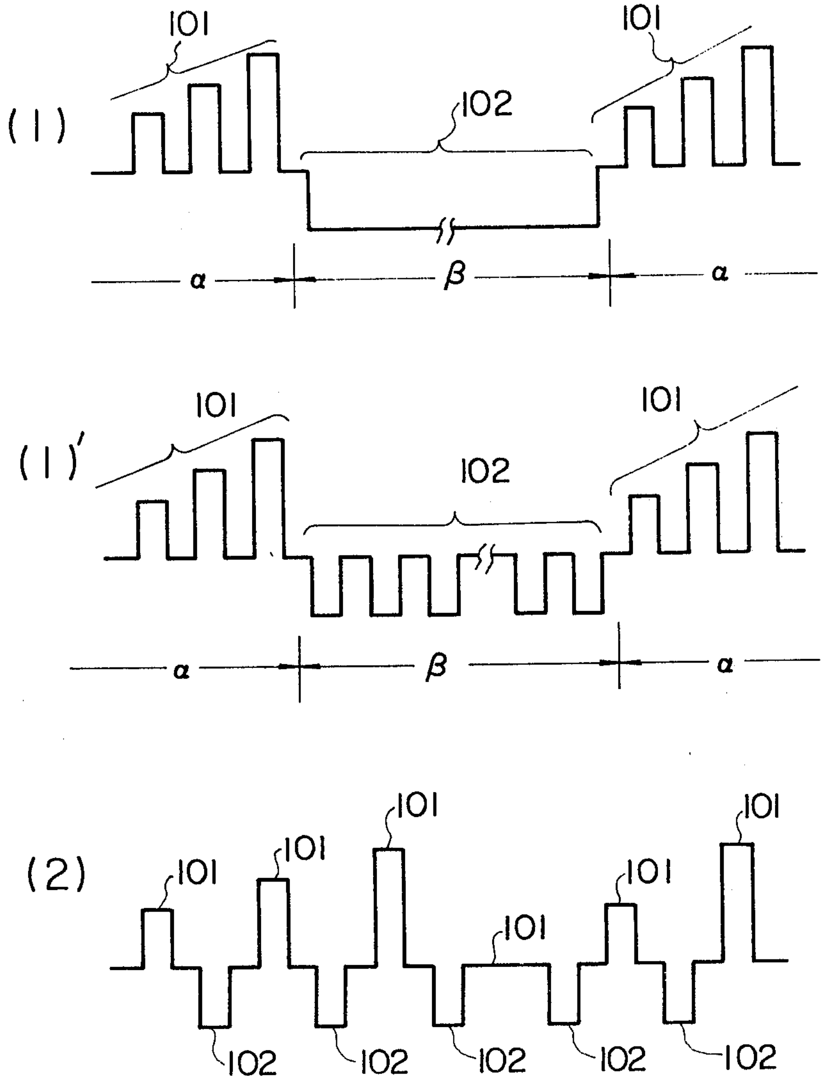
FIG. 10 is a waveform diagram for explaining a deflection calibrating signal.

As illustrated in FIG. 10, the deflection calibrating signal 102 produced by signal generator 61 is a square wave pulse which stretches at a certain voltage level in a direction of the opposite polarity to that of the recording signal voltage 101 and which is synchronized with the generation of the drop. Line (1) in FIG. 10 shows a case where deflection calibrating periods $\beta$ are provided between writing periods $\alpha$ during which the apparatus actually carries out the recording operation, at a frequency sufficient to attain the beneficial effect of this invention. In this case, the drop charging signal consists of a recording signal portion 101 and a deflection calibrating signal portion 102, and all the ink drops generated during the calibrating period are charged and deflected by the deflection calibrating signal. Line (1)' in FIG. 10 illustrates a case where every second one of the ink drops generated during the deflection calibrating period $\beta$ are used as the deflection calibrating drops. Line (2) in FIG. 10 illustrates an example of the charging signal in the case where dots for calibrating the amount of deflection are generated at predetermined intervals (at every fourth dot in the illustrated case) during the recording operation and where the recording operation and the deflection calibrating operation can be executed in parallel.

Shown as a typical example in FIG. 6 is a circuit arrangement which generates the drop charging signal as illustrated at (1)' in FIG. 10. More specifically, a sinusoidal signal for the Gunn oscillation as provided from an oscillator OSC1 is converted by a Schmitt trigger circuit 69 into square waves, which have their frequency divided by two by the flip-flop circuit 611. On the basis of the clock pulse signals (CP signals), under the recording state of the writing apparatus, the recording signals which have the same polarity, the same pulse width and the same frequency as the clock pulses are read out from the recording signal generator circuit 62, as illustrated for the period $\alpha$ in FIG. 10.

Under the deflection calibrating state of the writing apparatus, the drop deflection calibrating signals are prepared by the drop deflection calibrating signal-generator circuit 61, as illustrated during the period $\beta$. The signals are composed by the adder circuit 63, and the composite signal has its voltage level adjusted by the drop charging signal-adjusting circuit 64. Thereafter, the resultant signal is amplified by the fixed gain amplifier 65. The amplified voltage is applied to the charging electrode 56.

The drop charging signal voltage-adjusting circuit 64 is a multiplier whose two inputs are the control voltage from the deflection correcting signal-generator circuit 68 and the signal voltage from the drop charging signal-generator circuit system. The signal voltage from the drop charging signal generator is adjusted by the control voltage from the deflection correcting signal-generator circuit 68.

At $D < D_1$, the adjusting circuit 64 functions to increase the voltage of the drop charging signal, so that the amount of deflection of the drop is adjusted so as to come closer to the value $D_1$. At $D > D_1$, the adjusting circuit 64 functions to decrease the drop charging signal voltage, so that the drop deflection is adjusted so as to come closer to the value $D_1$. Accordingly, even when the drop deflecting sensitivity fluctuates, the amount of deflection D is controlled so as to become near to the value $D_1$ at all times, and the recording of a predetermined size can be conducted at predetermined positions at all times.

Let V denote the drop charging signal voltage to be applied to the charging electrode in order to charge the drop, and D denote the amount of deflection of the charged drop. At this time, the amount of charge Q on the ink drop is proportional to the signal voltage V. Therefore, the amount of deflection D is given from Equation (1) as follows:

$$D = \eta V \quad (2)$$

Here, $\eta$ denotes the deflection efficiency. As previously explained, it fluctuates due to a change in the surrounding condition of the ink drop writing apparatus or in case of the operation of the apparatus over a long period of time.

Figure 5:
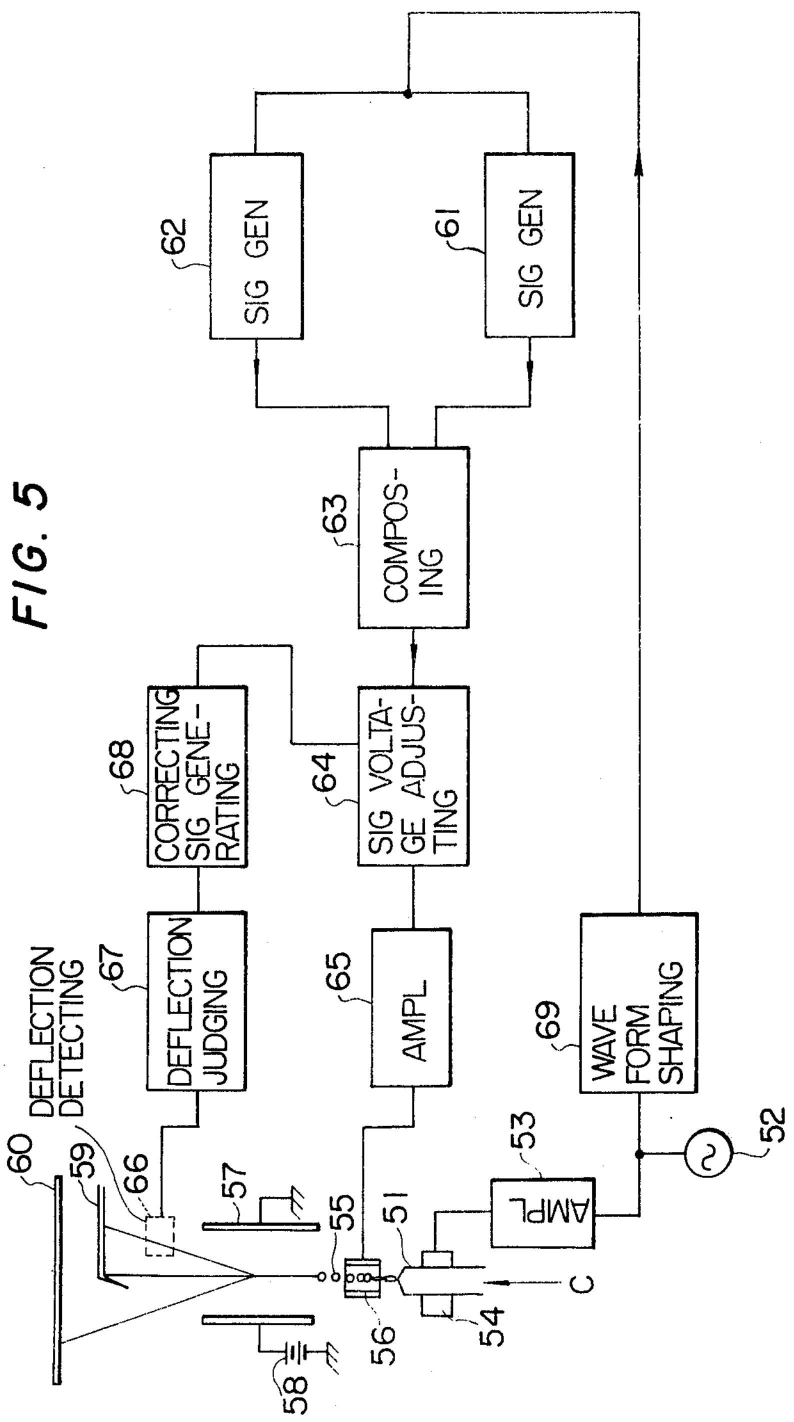
FIG. 5 is a schematic diagram of an ink drop writing apparatus embodying this invention.

In the ink drop writing apparatus of the present embodiment, the drop charging signal V is impressed on the charging electrode in such a manner that the composite signal obtained from the recording signal voltage $V_R$ and the deflection calibrating signal voltage $V_C$ is introduced to the charging electrode through the drop charging signal voltage-adjusting circuit and the fixed gain amplifier as elucidated with reference to FIG. 5. Letting G denote the overall gain of the signal voltage processing circuits, the drop charging signal V becomes:

$$V = G(V_R + V_C) \quad (3)$$

Substituting Equation (3) into Equation (2)

$$D = \eta G(V_R + V_C) = \eta G V_R + \eta G V_C \quad (4)$$

Here, put $\eta G V_R = D_R$ and $\eta G V_C = D_C$. With the apparatus of this invention, even when $\eta$ changes, G is controlled so that $D_C$ may become a fixed value at all times, and hence, $V_C$ is constant. After all, the control is made so that $\eta G$ may become a fixed value. Consequently, the amount of deflection $D_R$ to be used for the recording is determined by only the recording signal voltage $V_R$.

While the embodiment has referred to the method in which the amount of charge on the drop is regulated by regulating the magnitude of the signal voltage to be introduced to the charging electrode, it is apparent that the same effect is achieved by regulating the amount of charge in any other way.

In accordance with the foregoing embodiment of this invention, there can be provided an improved simple and inexpensive ink drop writing apparatus in which the amount of deflection of the ink drop is a predetermined one responsive to the recording signal even in case of a change in the surroundings of the writing apparatus and an operation over a long time and which can form the recording pattern of a predetermined width at a predetermined position of the writing paper at all times.

Another embodiment of this invention will now be explained. In the ink drop writing apparatus of the present embodiment, the amount of deflection of an ink drop is detected, and the strength of a deflecting field which acts on the ink drop is regulated on the basis of the detected information so that the amount of deflection of the ink drop may always be a predetermined one. More specifically, the ink drop generated is charged by a deflection calibrating signal which is incorporated between recording signals, and whether or not the amount of deflection of the drop is a predetermined one is monitored. In order to prevent the amount of deflection of the drop from deviating from the predetermined one, the strength of a deflecting field to act on the charged drop is regulated by a drop charging signal which is prepared by composing the recording signal and the deflection calibrating signal. Thus, recording of a predetermined width is executed at predetermined positions of a writing medium (recording paper) at all times.

Figure 11:
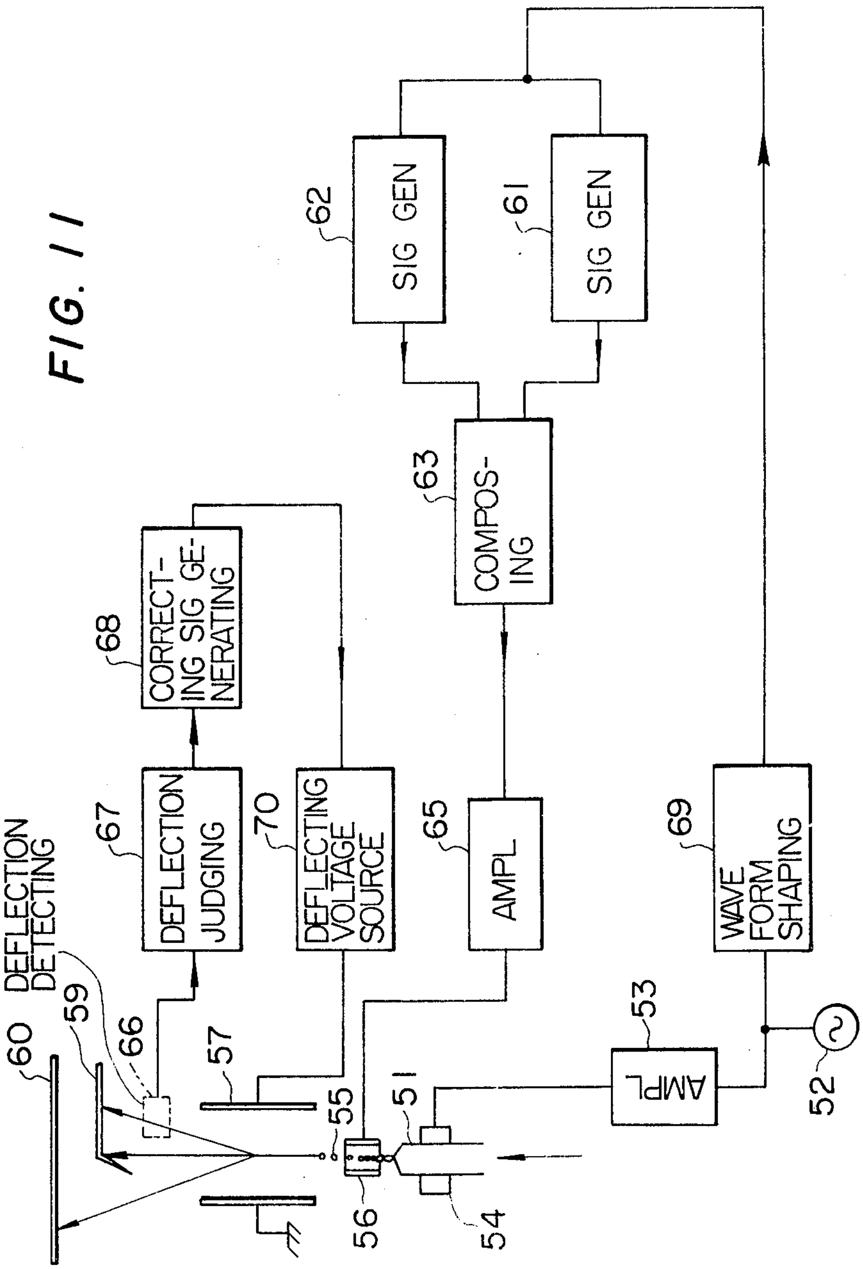
FIG. 11 is a schematic block diagram of another arrangement of an ink drop writing apparatus in which this invention may be employed.

FIG. 11 shows the embodiment. Referring to the figure, an ink drop 55 emitted from a nozzle 51 is charged and deflected by the drop deflection calibrating signal portion in a drop charging signal applied to a charging electrode 56. The drop charging signal to be applied to the charging electrode 56 is acquired in such a way that a deflection calibrating signal provided from a drop deflection calibrating signal-generator circuit 61 and synchronized with the generation of the drop and a recording signal provided from a recording signal-generator circuit 62 and synchronized with the generation of the drop are combined by a composer circuit 63 and that a composite signal thus obtained is amplified by an amplifier 65 having a fixed gain.

Whether or not the amount of deflection of the drop is a predetermined one is monitored by a drop deflection detector 66 and a deflection judging circuit 67. When the amount of deflection deviates from the predetermined amount, an electric signal responsive to the deviation is issued from a deflection correcting signal-generator circuit 68. The electric signal is applied to an output voltage control input of a deflecting voltage source 70 which is connected to deflecting electrodes 57 for establishing an electric field to act on the charged drop and deflect it. In order that the amount of deflection of the drop may be the predetermined one, an output voltage from the deflecting voltage source 70 is adjusted and the strength of the deflecting voltage to act on the drop is adjusted. Consequently, the deflecting sensitivity of the drop is always regulated to a predetermined value and the ink drop to be used for writing is always deflected by a predetermined amount responsive to the magnitude of the recording signal, so that the recording of a predetermined width can be carried out at predetermined positions on the writing paper 60.

Let $V_S$ denote the drop charging signal voltage to be impressed on the charging electrode 56 in order to charge the drop, $V_D$ denote the deflecting voltage from the deflecting voltage source 70, and D denote the amount of deflection of the drop charged by the charging voltage. Since the amount of charge Q on the ink drop is proportional to the quantity $V_S$ and the strength E of the electric field is proportional to the quantity $V_D$, the deflection D is given by the following equation:

$$D = \eta V_D V_S \quad (5)$$

Here, $\eta$ indicates the deflection efficiency. As previously set forth, it fluctuates due to a change in the surrounding conditions of the apparatus and in case of operation of the apparatus over a long period of time.

In the apparatus of the present embodiment, the drop charging signal $V_S$ applied to the charging electrode 56 is obtained in such a way that the composite signal between the recording signal voltage $V_R$ and the deflection calibrating signal voltage $V_C$ is fed through the fixed gain amplifier to the charging electrode as explained with reference to FIG. 11. Therefore, when the overall gain of the signal voltage processing circuits is represented by G, the drop charging signal voltage $V_S$ becomes as follows:

$$V_S = G(V_R + V_C) \quad (6)$$

From Equations (5) and (6), $$D = \eta V_D G(V_R + V_C) = \eta V_D G V_R + \eta V_D G V_C$$

Here, put $\eta V_D G V_R = D_R$ and $\eta V_D \cdot G V_C = D_C$. With the apparatus of this invention, even when $\eta$ changes, $V_D$ is controlled so that $D_C$ may become a fixed value at all times, and hence, $V_C$ is constant. After all, the control is made so that $\eta V_D$ may become a fixed value. Accordingly, the amount of deflection $D_R$ of the drop to be used for the writing is determined by only the recording signal voltage $V_R$, and the ink drop can always be directed to a predetermined position on the writing paper in dependence only on the value of $V_R$.

Although an ink drop writing system in which the ink drop is deflected under the action of an electric field has been described in the above embodiments, a system in which the ink drop is deflected by a magnetic field can similarly adopt this invention by controlling the strength of the deflecting magnetic field.

What is claimed is:

1. In an ink drop writing apparatus including a high frequency voltage source, nozzle means supplied with ink under pressure for generating an ink stream directed toward a recording medium, electro-mechanical converter means connected to said high frequency voltage source for vibrating said nozzle means to cause the ink stream to break up into a stream of regularly spaced ink drops, means for generating recording signals, means for charging the drops in accordance with the charge therein, means responsive to the recording signals for applying a signal voltage to said charging means, and means for deflecting the drops in accordance with the charge thereon, the improvement comprising a. calibrating means for controlling said charging means to apply a predetermined charge to selected drops;

b. means for detecting the amount of deflection of the selected drops and the deviation of the measured detection from a standard value; and c. correcting means responsive to said detecting means for regulating said charging means to compensate the amount of charge applied to the selected drops to eliminate said deviation, said correcting means including signal voltage adjusting means for regulating the magnitude of said signal voltage.

2. In an ink drop writing apparatus including a first high frequency voltage source, nozzle means supplied with ink under pressure for generating an ink stream directed toward a recording medium, electro-mechanical converter means connected to said first high frequency voltage source for vibrating said nozzle means to cause the ink stream to break up into a stream of regularly spaced ink drops, means for generating recording signals, circuit means for generating predetermined calibrating signals, means for charging the drops in accordance with the charge therein, charging voltage generating means for charging said charging means in accordance with said recording signals or said calibrating signals, and means for deflecting the drops in accordance with the charge therein, the improvement comprising a. calibrating means responsive to said circuit means for controlling said charging means to apply a predetermined charge to selected drops, including means for selectively connecting said recording signal generating means or said circuit means to said charging voltage generating means with a predetermined phase;

b. means for detecting the amount of deflection of the selected drops charged by said calibrating signals and for determining the deviation of the measured detection from a standard value;

c. corresponding means responsive to said detecting means for regulating said charging means to compensate the amount of charge applied to the drops to eliminate said deviation, said correcting means including signal voltage adjusting means for regulating the magnitude of the recording signals and the calibrating signals applied to said charging means in accordance with the output of said detecting means.

3. The ink drop writing apparatus according to claim 2, wherein correcting means includes i. an UP/DOWN counter responsive to the output terminal of said detecting means, ii. second high frequency source for driving said UP/DOWN counter, and iii. a digital/analog converter whose terminal is connected to the output terminal of said UP/DOWN converter.

4. The ink drop writing apparatus according to claim 2, wherein said voltage adjusting means comprises a multiplier connected to the outputs of said calibrating means and said detecting means.

5. The ink drop writing apparatus according to claim 2, wherein said calibrating means includes a composing circuit having two input terminals connected to receive the recording signals and the calibrating signals respectively and an output terminal connected to the input of said voltage adjusting means.

6. The ink drop writing apparatus according to claim 5, wherein said voltage adjusting means includes a multiplier having two input terminals, one of the input terminals of said multiplier being connected to the output terminal of said composing circuit and the other input terminal being connected to the input of said voltage adjusting means.

7. The ink drop writing apparatus according to claim 2, wherein said calibrating means include signal generating means for providing a calibrating voltage to be applied to said charging means to charge the selected drops, and composing means for generating a signal voltage as a composite of the calibrating voltage and the recording signals, whereby calibrating periods for regulating the amount of charges on the selected drops are provided separately from writing periods at such sufficient frequency that the writing can be performed at predetermined places on said writing medium.

8. In an ink drop writing apparatus wherein writing fluid is supplied to a nozzle which is vibrated by a transducer driving from a first high frequency power source to produce a stream of writing fluid which separates into individual drops directed toward a recording medium and including means for generating recording signals, means for charging the drops in accordance with said recording signals including a charging electrode and means responsive to said recording signals for applying a signal voltage to said charging electrode and means for deflecting the drops in accordance with the charge therein, the improvement comprising calibrating means for controlling said charging means to apply to selected drops a predetermined charge, deflection detecting means for detecting the amount of deflection of said selected drops, and correcting means responsive to said detecting means for regulating the magnitude of the signal voltage which is applied to said charging electrode to compensate the amount of charge applied to the drops of writing fluid so that said drops will be deflected by a predetermined amount for a given charge thereon including an UP/DOWN counter responsive to the output of said detecting means, a second high frequency source for driving said UP/DOWN counter, a digital/analog converter connected to the output of said UP/DOWN counter, and signal voltage adjusting means responsive to said calibrating means and said digital/analog counter for controlling the level of the voltage applied to said charging means.

9. The ink drop writing apparatus according to claim 8, wherein said calibrating means includes signal generating means for providing a calibrating voltage to be applied to said charging means to charge said selected drops and composing means for generating a signal voltage as a composite of said calibrating voltage and said recording signals whereby calibrating periods for regulating the amount of charges on said drops are provided separately from writing periods at such sufficient frequency that the writing can be performed at predetermined places on said writing medium.

10. The ink drop writing apparatus according to claim 9, wherein said calibrating voltage is of opposite polarity to said input signal.

11. In an ink drop writing apparatus wherein writing fluid is supplied to a nozzle which is vibrated by a transducer driven from a first high frequency power source to produce a stream of writing fluid which separates into individual drops directed toward a recording medium and including means for generating recording signals, means for charging the drops in accordance with said recording signals and deflection means for generating an electrostatic field to deflect the drops in accordance with the charge therein, the improvement comprising calibrating means for controlling said charging means to apply to selected drops a predetermined charge, deflection detecting means for detecting the amount of deflection of said selected drops, and correcting signal generating means responsive to said detecting means for regulating said deflection means to adjust the strength of said electrostatic field so that said drops will be deflected by a predetermined amount for a given charge thereon including an UP/DOWN counter responsive to the output of said detecting means, a second high frequency source for driving said UP/DOWN counter, a digital/analog converter connected to the output of said UP/DOWN counter, and signal voltage adjusting means responsive to the output of said digital/analog converter for regulating said deflection means.

12. The ink drop writing apparatus according to claim 11, wherein said calibrating means includes signal generating means for providing a calibrating voltage to be applied to said charging means to charge said selected drops and composing means for generating a signal voltage as a composite of said calibrating voltage and said recording signals whereby calibrating periods for regulating the amount of charges on said selected drops are provided separately from writing periods at such sufficient frequency that the writing can be performed at predetermined places on said writing medium.

13. The ink drop writing apparatus according to claim 12, wherein said calibrating voltage is of opposite polarity to said input signal.

* * * * *